United States Patent
Gasca Fuentes (10) Patent No.: US 10,328,861 B2
(45) Date of Patent: Jun. 25, 2019

(54) HANGER ASSEMBLY FOR HANGING AN OBJECT WITHIN AN INTERIOR OF A VEHICLE

(71) Applicant: GM GLOBAL TECHNOLOGY OPERATIONS LLC, Detroit, MI (US)

(72) Inventor: Elida Yazmin Gasca Fuentes, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 15/677,563

(22) Filed: Aug. 15, 2017

(65) Prior Publication Data

US 2019/0054861 A1    Feb. 21, 2019

(51) Int. Cl.
| | |
|---|---|
| *B60R 7/02* | (2006.01) |
| *B60R 7/08* | (2006.01) |
| *B60R 5/04* | (2006.01) |
| *B60R 7/04* | (2006.01) |

(52) U.S. Cl.
CPC .............. *B60R 7/08* (2013.01); *B60R 7/043* (2013.01); *B60R 5/044* (2013.01); *B60R 7/02* (2013.01); *Y10S 224/925* (2013.01)

(58) Field of Classification Search
CPC .... B60R 7/00; B60R 7/02; B60R 7/08; B60R 7/10; B60R 2011/008; B60R 2011/0084; B60R 5/044; Y10S 224/925; Y10S 224/927
USPC .............. 224/549, 543, 567, 539, 545, 554; 248/307; D6/323
See application file for complete search history.

(56) References Cited

U.S. PATENT DOCUMENTS

| | | | | | |
|---|---|---|---|---|---|
| 3,424,418 | A | * | 1/1969 | Freedman | A47G 25/065 224/927 |
| 4,221,354 | A | * | 9/1980 | Kempkers | A47G 25/065 224/927 |
| 4,720,028 | A | * | 1/1988 | Takemura | B60R 7/10 224/313 |
| 4,923,159 | A | * | 5/1990 | Wang | A47G 1/17 248/205.3 |
| 5,226,569 | A | * | 7/1993 | Watjer | B60R 7/10 211/123 |
| 5,415,457 | A | * | 5/1995 | Kifer | B60N 2/70 224/275 |
| 5,507,423 | A | * | 4/1996 | Fischer | B60R 7/10 224/281 |
| 5,769,294 | A | * | 6/1998 | Heinz | B60R 7/02 224/544 |

(Continued)

*Primary Examiner* — Justin M Larson (57) ABSTRACT

A hanger assembly for hanging an object within an interior of a vehicle includes a base and a hanger. The base is configured to be fixed to a component within the interior of the vehicle. The base includes an anchor wall, first and second side walls extending from the anchor wall, and a retaining wall opposite the anchor wall and adjacent to the side walls. The anchor wall, the side walls, and the retaining wall cooperate to define a channel having a longitudinal axis. The hanger is slidable within the channel along the longitudinal axis. The hanger includes a first portion configured to be disposed within the channel and a second portion including a hook to support the object. The first portion has an inner surface oriented toward the anchor and an outer surface oriented toward the retaining wall when the hanger is disposed in the channel.

17 Claims, 5 Drawing Sheets

(56) References Cited

U.S. PATENT DOCUMENTS

| | | | | |
|---|---|---|---|---|
| 6,065,657 A * | 5/2000 | Fischer | B60R 7/10 | 224/313 |
| 6,499,707 B2 * | 12/2002 | Hamerski | A47G 1/175 | 248/205.3 |
| 6,502,731 B1 * | 1/2003 | Gehring | B60R 7/02 | 224/282 |
| 6,533,340 B1 * | 3/2003 | Gaunzon | B60R 7/02 | 224/268 |
| 6,692,067 B2 * | 2/2004 | Inari | B60N 3/023 | 224/313 |
| 6,935,601 B2 * | 8/2005 | Tanaka | B60R 7/02 | 224/282 |
| 6,994,237 B2 * | 2/2006 | Nabert | B60R 7/10 | 224/311 |
| 7,178,770 B2 * | 2/2007 | Ryu | A47G 1/175 | 248/205.3 |
| 8,413,862 B2 * | 4/2013 | Castillo | B60R 7/10 | 224/313 |
| 8,448,910 B2 * | 5/2013 | Ernst | A47G 25/0607 | 248/223.41 |
| 8,490,935 B2 * | 7/2013 | Myers | B60R 7/10 | 248/289.11 |
| 8,757,570 B2 * | 6/2014 | Ernst | F16B 45/00 | 248/223.41 |
| 9,016,642 B1 * | 4/2015 | Ay | F16B 45/00 | 248/205.1 |
| 9,783,117 B2 * | 10/2017 | Nieto | B60R 5/04 | |
| 9,797,549 B2 * | 10/2017 | Lee | A47G 1/175 | |
| 10,065,565 B2 * | 9/2018 | Mozurkewich | B60R 7/08 | |
| 10,080,454 B2 * | 9/2018 | Sotome | B60R 7/10 | |
| 2007/0272819 A1 * | 11/2007 | Wang | A47G 25/0607 | 248/476 |
| 2011/0035910 A1 * | 2/2011 | Wu | F16M 11/10 | 24/303 |
| 2012/0274106 A1 * | 11/2012 | Ackeret | B60R 7/043 | 297/188.01 |
| 2016/0207467 A1 * | 7/2016 | Parlow | B60R 5/044 | |
| 2017/0088057 A1 * | 3/2017 | Prezecki, II | B60R 5/047 | |
| 2017/0217378 A1 * | 8/2017 | Rodriguez | B60R 7/10 | |

* cited by examiner

HANGER ASSEMBLY FOR HANGING AN OBJECT WITHIN AN INTERIOR OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to hanger assemblies for hanging an object within an interior of a vehicle.

Some vehicle interiors include excess space that may be used as storage space. For example, a vehicle may include storage space in a rear portion of a cabin, in a trunk, in door pockets, in a glove compartment, between seats, or behind seats. Vehicle storage spaces are typically open and empty. Thus, occupants can utilize the empty space to store large or unwieldly items with minimal interference from the interior vehicle structure.

SUMMARY

The present disclosure provides a hanger assembly for hanging an object within an interior of a vehicle. The hanger assembly includes a base and a hanger. The base is configured to be fixed to a component within the interior of the vehicle. The base includes an anchor wall, first and second side walls, and a retaining wall. The first and second side walls extend from the anchor wall. The retaining wall is adjacent to the first and second side walls. The retaining wall is opposite the anchor wall. The anchor wall, the first and second side walls, and the retaining wall cooperate to define a channel having a longitudinal axis. The hanger is slidable within the channel along the longitudinal axis. The hanger includes a first portion and a second portion. The first portion is configured to be disposed within the channel of the base. The first portion has an inner surface and an outer surface. The inner surface is oriented toward the anchor wall when the hanger is disposed in the channel. The outer surface is oriented toward the retaining wall when the hanger is disposed in the channel. The second portion includes a hook that is configured to support the object.

In some configurations, the retaining wall of the base includes a first lip and a second lip. The first lip extends from the first side wall toward the second side wall. The second lip extends from the second side wall toward the first side wall.

In some configurations, the hanger is slidable within the channel between an engaged configuration and a disengaged configuration. When the hanger is in the engaged configuration, the hanger is disposed within the channel. When the hanger is in the disengaged configuration, the hanger is removed from the channel such that the hanger is completely disengaged from the base.

In some configurations, the base further includes a stop wall. The stop wall extends from the anchor wall between the first side wall and the second side wall. The stop wall engages the first portion of the hanger to prevent translation of the hanger in a first direction beyond a first position when the first portion of the hanger is inserted into the channel.

In some configurations, the second portion of the hanger includes a hook wall. The hook wall is parallel to the stop wall when the hanger is disposed in the base. The hook wall is disposed between the hook and the first portion of the hanger.

In some configurations, the hanger and the base are sized to yield an interference fit between the hanger and the base to maintain the hanger within the channel when the hanger is in the engaged configuration.

In some configurations, at least one of the first side wall and the second side wall includes a protrusion. The protrusion is configured to extend toward the hanger and engage the hanger to yield the interference fit.

In some configurations, the first portion of the hanger further includes first and second flanges extending from the inner surface. The first flange engages the first side wall and the anchor wall when the hanger is disposed in the channel. The second flange engages the second side wall and the anchor wall when the hanger is disposed in the channel.

In some configurations, the first portion of the hanger further includes third and fourth flanges extending from the outer surface. The third flange engages the first side wall and the retaining wall when the hanger is disposed in the channel. The fourth flange engages the second side wall and the retaining wall when the hanger is disposed in the channel.

In some configurations, the hook has an outside surface and a plurality of ribs projecting from the outside surface.

The present disclosure provides another hanger assembly for hanging an object within an interior of a vehicle. The hanger assembly includes a base and a hanger. The base is configured to be fixed to a component within the interior of the vehicle. The base has an exterior surface and an interior surface. The exterior surface is configured to engage the component. The interior surface defines a channel. The hanger includes a first portion and a second portion. The first portion is configured to be disposed within the channel of the base. The second portion includes a hook. The hook is configured to support the object. The hanger is movable between an engaged configuration and a disengaged configuration. When the hanger is in the engaged configuration, the hanger is disposed within the channel. When the hanger is in the disengaged configuration, the hanger is removed from the channel such that the hanger is completely disengaged from the base.

In some configurations, the hanger and the base are sized to yield an interference fit between the hanger and the base to maintain the hanger within the channel when the hanger is in the engaged configuration.

In some configurations, the channel of the base is at least partially defined by an anchor wall. The anchor wall is configured to abut the component of the vehicle, a first side wall extending from the anchor wall, and a second side wall extending from the anchor wall and opposite the first side wall. At least one of the first side wall and the second side wall includes a protrusion. The protrusion is configured to extend toward the hanger and engage the hanger to yield the interference fit.

In some configurations, the first portion of the hanger further includes first and second flanges extending from an inner surface of the hanger. The first flange engages the first side wall and the anchor wall when the hanger is disposed in the channel. The second flange engages the second side wall and the anchor wall when the hanger is disposed in the channel.

In some configurations, the first portion of the hanger further includes third and fourth flanges extending from an outer surface of the hanger. The third flange engages the first side wall when the hanger is disposed in the channel. The fourth flange engages the second side wall and when the hanger is disposed in the channel.

In some configurations, the hook has an inside surface, an outside surface, and a plurality of ribs. The inside surface is configured to support the object. The outside surface is opposite the inside surface. The plurality of ribs projects from the outside surface.

The present disclosure provides a cargo cover assembly for a vehicle. The cargo cover assembly includes a rigid cargo cover and a hanger. The rigid cargo cover is pivotally attached to a component in the vehicle. The rigid cargo cover is pivotally attached to a component in the vehicle and movable between a closed position and an open position. In the closed position, the cargo cover conceals a rear storage area in the vehicle. In an open position, the cargo cover provides access to the rear storage area. The hanger assembly includes a base and a hanger. The base is fixed to the cargo cover. The hanger is configured to be slidably disposed within a channel of the base. The hanger is movable between an engaged configuration and a disengaged configuration. When the hanger is in the engaged configuration the hanger is disposed within the channel. When the hanger is in the disengaged configuration, the hanger is removed from the channel such that the hanger is completely disengaged from the base.

In some configurations, the base includes an anchor wall. The anchor wall engages an underside of the cargo cover. The anchor wall defines an aperture. A fastener extends through the aperture to fix the base to the cargo cover such that the base moves with the cargo cover. The hanger assembly is concealed when the cargo cover is in the closed position.

In some configurations, the hanger and the base are sized to yield an interference fit between the hanger and the base to maintain the hanger in the base when the hanger is in the engaged configuration.

In some configurations, the base further includes an anchor wall, a retaining wall, and first and second side walls. The anchor wall engages the cargo cover. The retaining wall is opposite the anchor wall. The first and second side walls extend between the anchor wall and the retaining wall. The hanger engages the first and second side walls to yield an interference fit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, some vehicles include excess space that is used as storage space. Storage space that is located in a trunk or a cargo area of the vehicle is often open and unobstructed to enable storage of large or unwieldy objects. Passengers also commonly use the open storage space for smaller items, such as shopping bags.

A significant portion of the storage space is wasted when it is used for small objects that cannot easily be stacked. More specifically, vertical space within the storage area is left unused when a floor of the storage space is occupied by small objects. Moreover, even when objects can be vertically stacked within the storage space, the objects often slide around, increasing the likelihood of damage to the objects and distraction and inconvenience for the occupants. The amount of usable storage space within the storage area can be increased by including organization features such as shelves, pockets, and hooks within the storage area. However, the storage features occupy the storage space and may obstruct large objects, limiting the use of the storage space to smaller objects.

The present disclosure relates to a hanger assembly for hanging an object within an interior of a vehicle. The hanger assembly increases the usable storage area by enabling a user to hang objects over other objects that are stored on a floor of the storage area. The hanger assembly may also be easier for the user to access than the floor of the storage area.

In one example, the hanger assembly includes a base that is fixed to a component within a storage space of the vehicle and a hanger that is completely removable from the base. A user can engage the hanger with the base to use a hook of the hanger to support a hanging object. The user can disengage the hanger from the base when the hook is not in use. The removable design allows the user to remove obstructions from the storage space to create additional space for storing or transporting larger objects. The user can also remove the hanger from the base to prevent damage to the hanger when it is not in use. Damaged hangers can easily be replaced. The user can also remove the hanger and replace it with another hanger having a different design, for example, a hanger having a different style of hook or a different material of construction.

In another example, the hanger assembly includes a base that is fixed to a component within the vehicle and a hanger that is slidable along a longitudinal axis of the base. Thus, the hanger assembly enables a user to change the location of a hook on the hanger to optimize storage space within a storage area. The user can also slide the hanger along the longitudinal axis between a first position and a second position, where the first position enables the user to conveniently load an object onto the hook and the second position provides a better location for storage or concealment of the object.

In various implementations, the hanger assembly is fixed to a cargo cover within a rear storage area of the vehicle. The hanger assembly includes a base that is fixed to an underside surface of the cargo cover and a hanger that is slidably inserted into the base. When the cargo cover is pivoted into a closed position, the hanger assembly, and therefore an object hanging on the hanger assembly, is hidden from individuals who are outside the vehicle.

Figure 1:
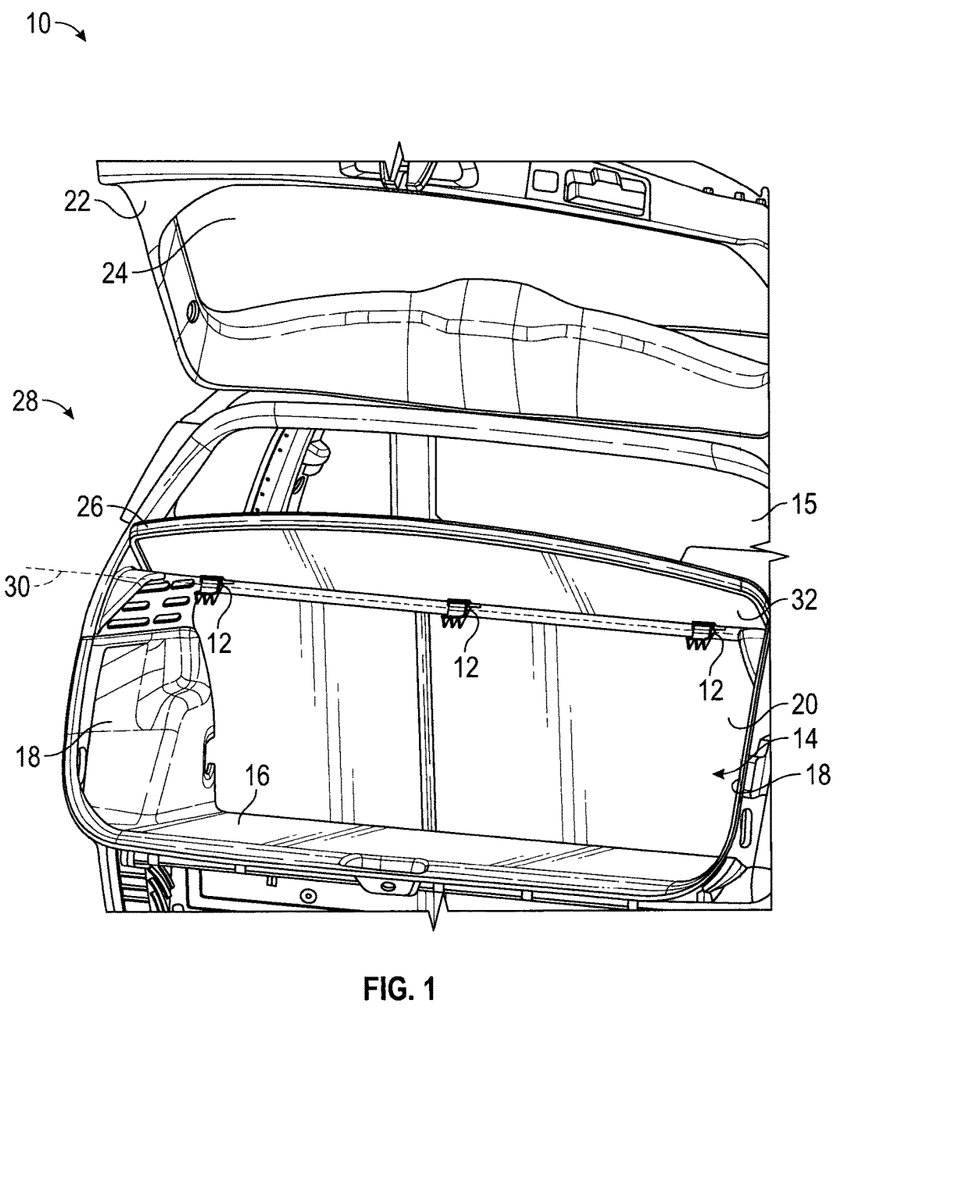
FIG. 1 is a perspective view of a rear storage area of a vehicle including a cargo cover and a hanger assembly according to the present disclosure attached to an underside surface of the cargo cover.

Referring to FIG. 1, a vehicle 10 includes multiple hanger assemblies 12 according to certain aspects of the present disclosure. The vehicle 10 further includes a rear storage area 14 in an interior 15 of the vehicle 10. For example, the rear storage area 14 can be located within a passenger cabin or in a trunk. The rear storage area 14 is at least partially defined by a floor 16, two opposing side walls 18, and a cross-car wall 20. In various implementations, the cross-car wall 20 may be omitted such that the rear storage area 14 is at least partially defined by one or more seat backs (not shown).

The vehicle 10 also includes a liftgate or rear door 22 having a window 24. The liftgate 22 moves between an opened position (shown in FIG. 1) and a closed position (not shown). The liftgate 22 is opened to provide access to the rear storage area 14. The liftgate 22 is closed to prevent access to the rear storage area 14 and contain objects that are stowed in the rear storage area 14.

The rear storage area 14 also includes a cargo cover 26 that is pivotable between an opened position (shown in FIG. 1) and a closed position (not shown). When the cargo cover 26 is in the closed position, the rear storage area 14 is concealed so that it is not visible from an exterior 28 of the vehicle. More specifically, when the cargo cover 26 and the liftgate 22 are both closed, a person outside the vehicle 10 cannot view the contents of the rear storage area 14 through the window 24 of the liftgate 22. The cargo cover 26 is connected to a component within the interior of the vehicle 10, such as the cross-car wall 20. The cargo cover 26 is pivotable about a pivot axis 30 that extends in a cross-car direction.

The hanger assemblies 12 are fixed to a component within the rear storage area 14. For example, the hanger assemblies 12 may be fixed to an underside surface 32 of the cargo cover 26 as shown in FIG. 1. The hanger assemblies 12 are movable with the cargo cover 26. Although three (3) hanger assemblies 12 are shown, additional or fewer of the hanger assemblies 12 may be included in the rear storage area 14 within the scope of the present disclosure.

An occupant may use the rear storage area 14 to store and transport objects in the vehicle 10. The user may place objects on the floor 16 and hang objects from the hanger assemblies 12. The hanger assemblies 12 increase the usable space in the storage area 14. For example, the hanger assemblies 12 can be used to suspend objects above other objects that are stowed on the floor 16. When the cargo cover 26 is closed, the hanger assemblies 12 are concealed by the cargo cover 26.

Figure 2:
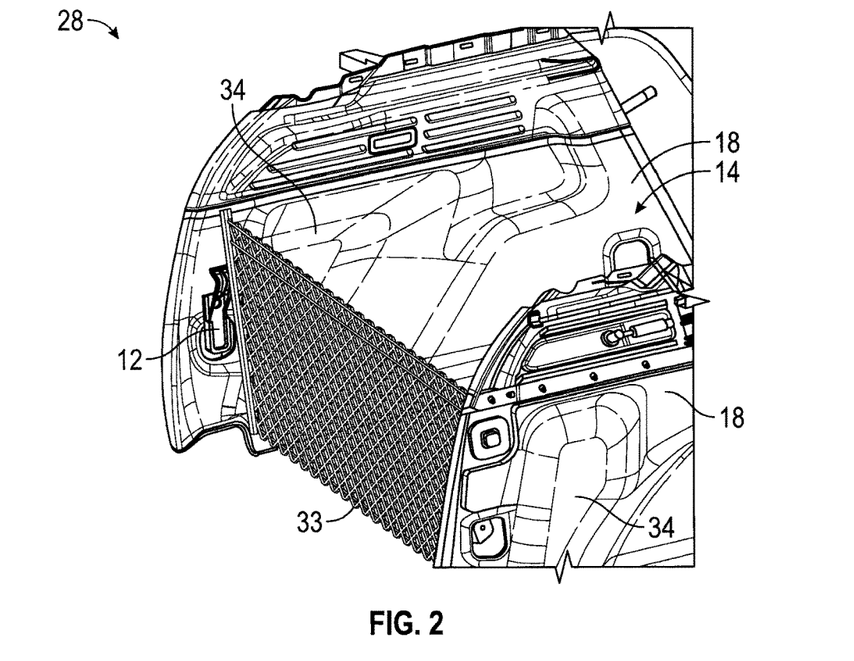
FIG. 2 is a perspective view of the rear storage area of the vehicle the hanger assembly attached to a side wall in the rear storage area.

With reference to FIG. 2, another view of the rear storage area 14 of the vehicle 10 is shown. The storage area 14 further includes a cross-car net 33 extending between the opposing side walls 18. The cross-car net 33 is disposed adjacent to the liftgate 22 (shown in FIG. 1) when the liftgate 22 is in the closed position.

Each of the opposing side walls 18 includes a recessed portion 34 extending toward the exterior 28 of the vehicle 10. The recessed portion 34 creates additional space within the rear storage area 14. However, the additional space may be unusable depending on the location, shape, and size of the recessed portion 34. Thus, the hanger assembly 12 may be mounted to the side wall 18 to enable use of the additional space created by the recessed portion 34.

Figure 3:
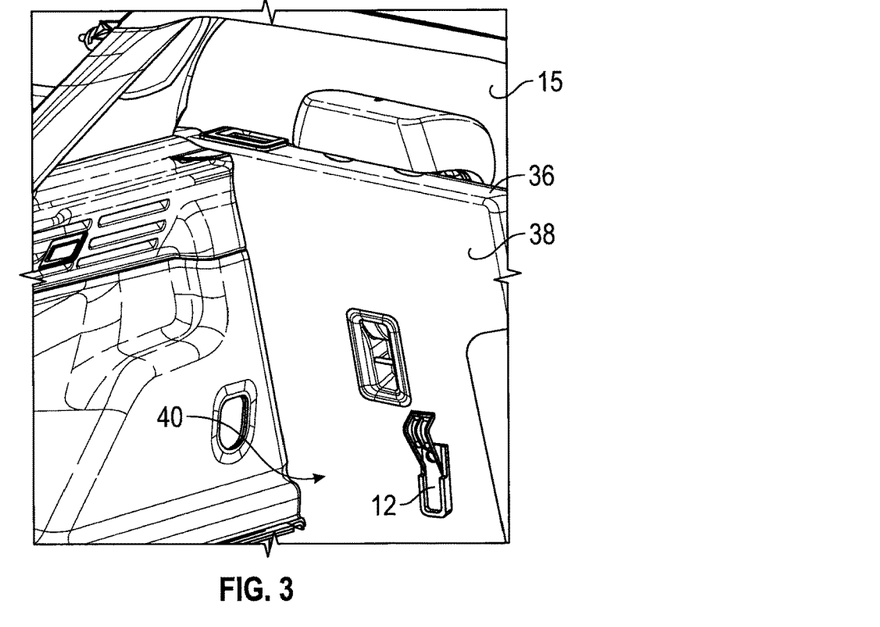
FIG. 3 is a perspective view of the rear storage area with the hanger assembly attached to a seat back.

Referring to FIG. 3, another view of the interior 15 of the vehicle 10 is shown. The vehicle interior 15 includes a first seat 36 having a back 38. A second seat (not shown) is disposed behind the first seat 36 so that a passenger in the second seat is facing the back 38 of the first seat 36. The hanger assembly 12 is fixed the back 38 of the first seat 36. The hanger assembly 12 enables the use of a space 40 between the first seat 36 and the second seat without reducing passenger foot space.

Alternative locations for the hanger assembly 12 are contemplated within the scope of the present disclosure. In one example, the hanger assembly 12 is disposed on a dashboard and used to support a GPS device, a phone, or a tablet. In another example, the hanger assembly 12 is disposed between or adjacent to vehicle seats and used to support a cup, a handbag, sunglasses, or a book. In still another example, the hanger assembly 12 is mounted within a glove compartment and used to optimize storage space within the glove compartment.

Figure 4:
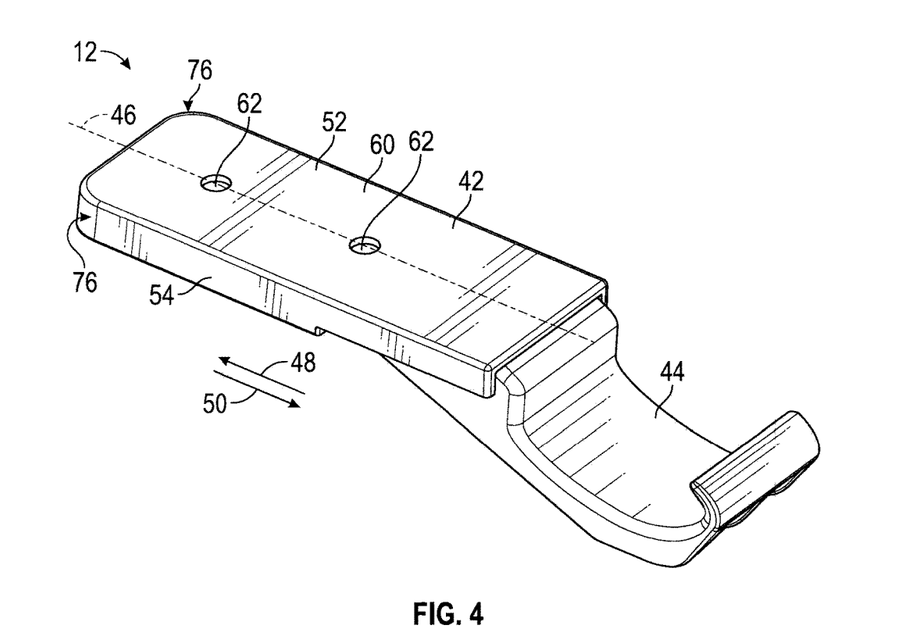
FIG. 4 is a perspective view of the hanger assembly of FIG. 1 including a hanger and a bracket, with the hanger in an engaged configuration.
Figure 5:
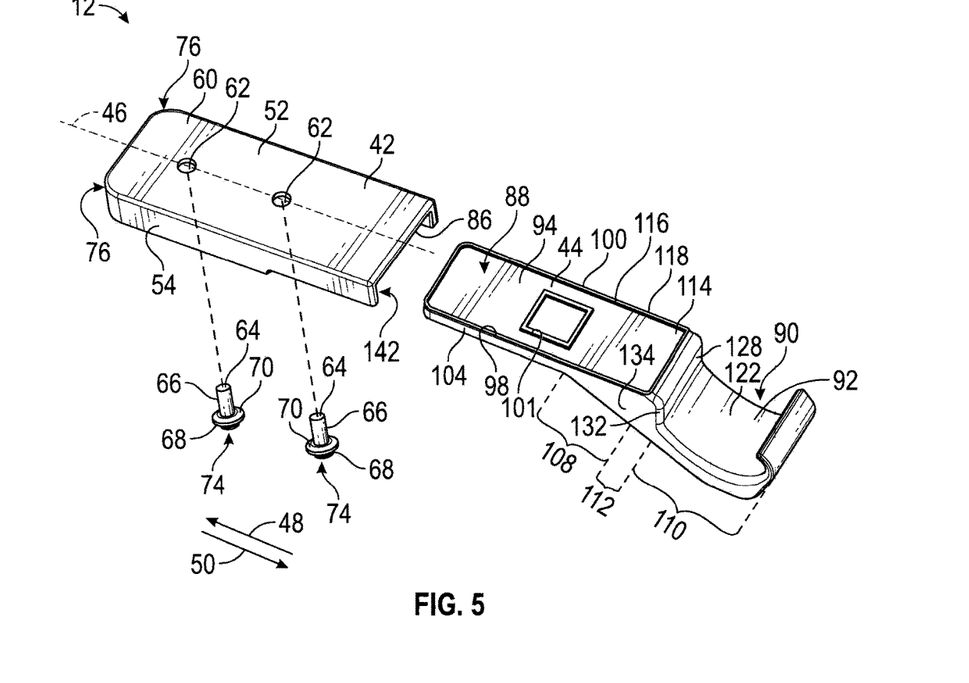
FIG. 5 is an exploded view of the hanger assembly of FIG. 4.
Figure 6:
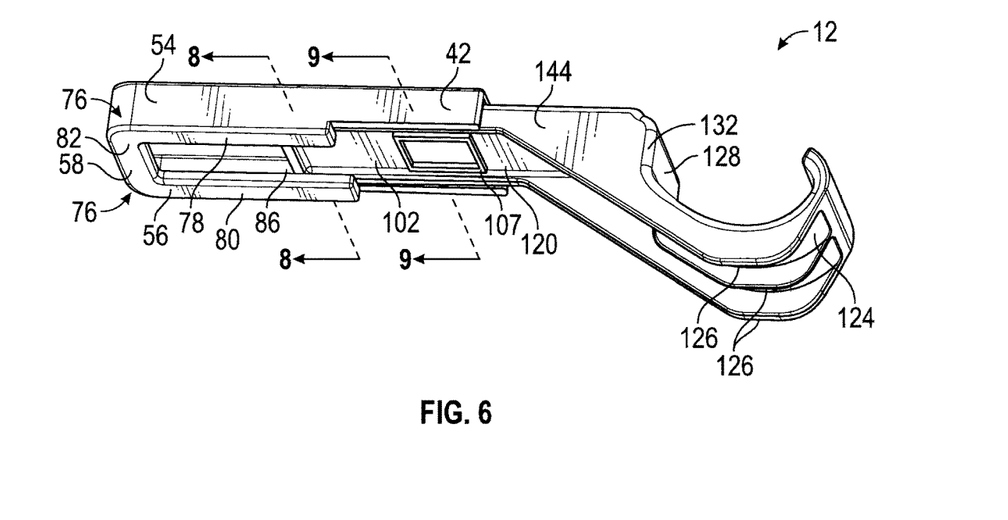
FIG. 6 is a perspective view of an underside of the hanger assembly of FIG. 4.

With reference to FIGS. 4-6, the hanger assembly 12 includes a base 42 and a hanger 44. The hanger 44 is slidable within the base 42 along a longitudinal axis 46 of the base 42. The hanger 44 can engage the base 42, as shown in FIG. 4, or the hanger 44 can be completely disengaged from the base 42, as shown in FIG. 5. Thus, the hanger 44 moves between an engaged configuration (FIG. 4) and a disengaged configuration (FIG. 5) with respect to the base 42. The hanger 44 moves through an intermediate position, as shown in FIG. 6, between the engaged configuration and the disengaged configuration.

A user can remove the hanger 44 from the base 42 without expending significant effort. For example, the user can pull the hanger 44 along the longitudinal axis 46 to remove it from the base 42 with minimal force and/or without using a tool (i.e., by hand). When the hanger 44 is in the engaged configuration, the retention force of the hanger 44 within the base 42 is high (i.e., the hanger 44 remains engaged with the base 42 when the hanger assembly 12 is in use). The hanger 44 and the base 42 may be constructed from nylon or polypropylene, for example. However, the hanger 44 and the base 42 may be constructed from other materials to change the strength, retention force, or removal force.

Figure 7:
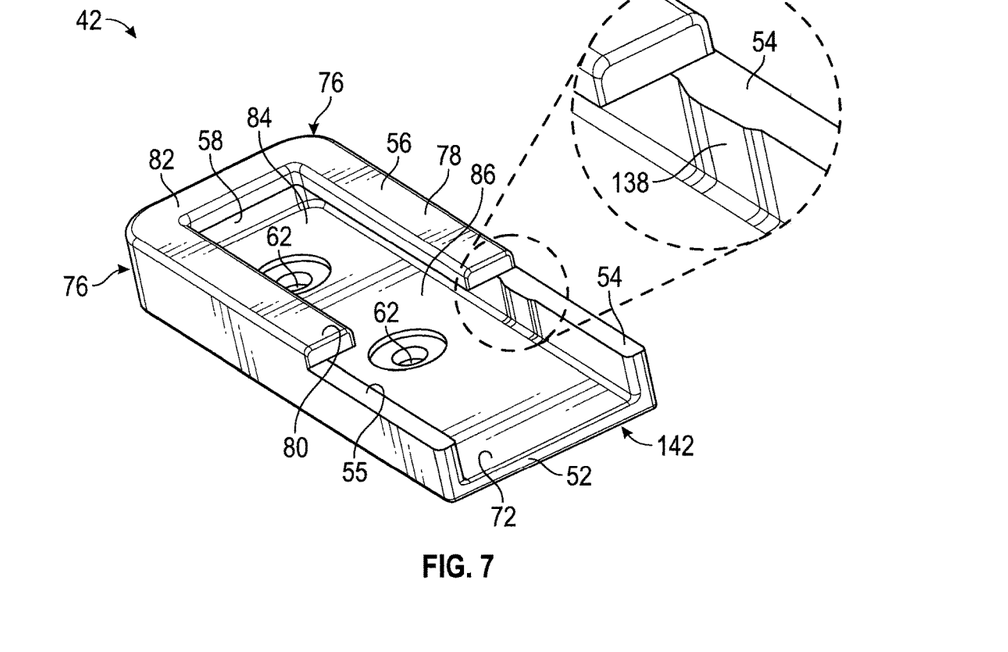
FIG. 7 is a perspective view of an underside of the base of the hanger assembly of FIG. 4.

The hanger 44 is completely removable from the base 42. The user can assemble the hanger 44 to the base 42 by sliding the hanger 44 along the longitudinal axis 46 in a first direction 48. The occupant can similarly remove the hanger 44 from the base 42 by sliding the hanger 44 along the longitudinal axis 46 in a second direction 50 opposite the first direction 48 until the hanger 44 is disengaged from the base 42. The base 42 includes an anchor wall 52, first and second side walls 54, 55 a retaining wall 56, and a stop wall 58 (FIG. 7).

The base 42 can be mounted to the component within the vehicle 10 (e.g., as shown in FIGS. 1-3). An outer surface 60 of the anchor wall 52 abuts the component within the vehicle 10 when the base 42 is mounted to the component. The anchor wall 52 defines one or more apertures 62 that receive respective fasteners 64 (FIG. 5) for mounting the base 42 to the component.

Each fastener 64 includes a shaft 66 and a head 68. When the base 42 is mounted to the component, the shaft 66 extends through the respective aperture 62 of the base 42 and fixedly engages the component. A surface 70 of the head 68 of the fastener 64 engages an underside surface 72 of the anchor wall 52 of the base 42 to fix the base 42 to the component. As best shown in FIG. 7, each aperture 62 is countersunk so that a proximal end 74 of the fastener 64 is disposed flush with or below the underside surface 72 of the anchor wall 52 of the base 42.

In various implementations, the base 42 may be integrally formed with the component. For example, the base 42 may be a molded feature in the side wall 18 of the rear storage area 14 or the back 38 of the first seat 36. When the base 42 is integrally formed with the component, the fasteners 64 are omitted from the hanger assembly 12.

In various implementations, the base 42 may be removable from the component. For example, the base 42 can include keyhole slots (not shown) instead of the apertures 62. The fasteners 64 may extend through the keyhole slots to fix the base 42 to the component. The user removes the base 42 from the component by sliding and lifting the base 42 away from the fasteners 64. The fasteners 64 may remain attached to the component when the base is removed.

Returning to FIGS. 4-6, the side walls 54, 55 of the base 42 extend from the anchor wall 52 away from the component and are perpendicular to the anchor wall 52. The stop wall 58 extends from the anchor wall 52 and is perpendicular to the anchor wall 52 and the side walls 54, 55. The stop wall 58 is disposed between the side walls 54, 55. The stop wall 58 is connected to each of the side walls 54, 55 by respective rounded corner portions 76.

Figure 8:
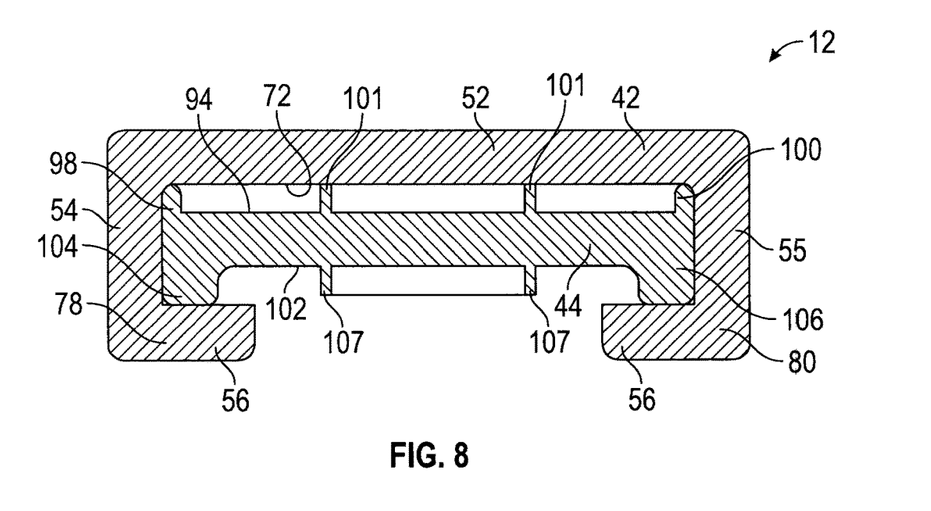
FIG. 8 is a cross sectional view of the hanger assembly of FIG. 4 taken at line 8-8 of FIG. 6.
Figure 9:
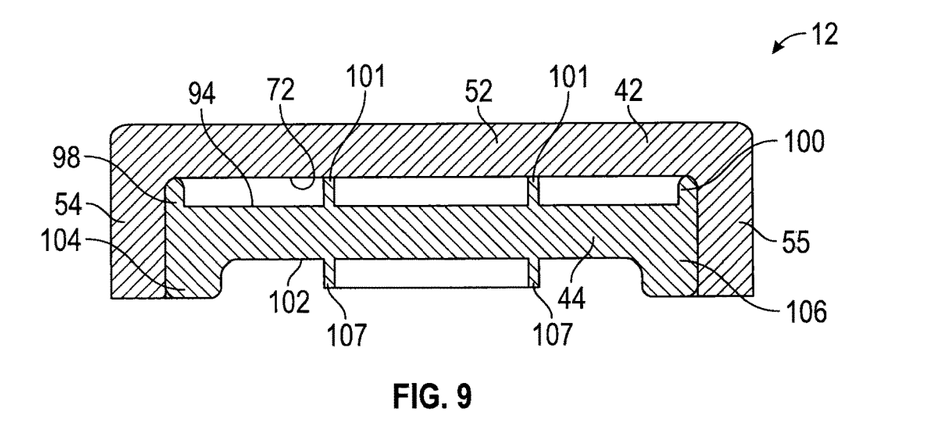
FIG. 9 is a cross sectional view of the hanger assembly of FIG. 4 taken at line 9-9 of FIG. 6.

The retaining wall 56 extends from the side walls 54, 55 and the stop wall 58 and is perpendicular to the side walls 54, 55 and the stop wall 58. Thus, the retaining wall 56 is parallel to the anchor wall 52. The retaining wall 56 is formed by a first lip 78 extending from the first side wall 54 toward the second side wall 55, a second lip 80 extending from the second side wall 55 toward the first side wall 54, and a third lip 82 extending from the stop wall 58 toward the first and second side walls 54, 55. The third lip 82 connects the first lip 78 and the second lip 80. Thus, the lips 78, 80, 82 of the retaining wall 56 minimize material and weight of the base 42 because the lips 78, 80, 82 are only present where they engage the hanger 44. In various implementations, the retaining wall 56 fully extends between the first side wall 54 and the second side wall 55 (i.e., extends from the first side wall 54 to the second side wall 55). As best shown in FIGS. 7-9, the first and second lips 78, 80 may extend along only portions of the respective first and second side walls 54, 55 to enable quicker disengagement of the hanger 44 from the base 42 when the user slides the hanger 44 along the longitudinal axis 46 to remove the hanger 44 from the base 42. In various implementations, the retaining wall 56 extends along an entire length of the base 42 (i.e., from the stop wall 58 to the open end 142).

An interior surface 84 of the base 42 defines a channel or track 86. More specifically, the anchor wall 52, the first and second side walls 54, 55, and the retaining wall 56 cooperate to form the channel 86. The hanger 44 is disposed within the channel 86 when it is in the engaged configuration. The hanger 44 is removed from the channel 86 when it is in the disengaged configuration.

Referring to FIG. 5, the hanger 44 includes a first portion 88 and a second portion 90. The first portion 88 of the hanger 44 is disposed within the channel 86 of the base 42 when the hanger 44 is in the engaged configuration. The second portion 90 of the hanger 44 includes a hook 92 for supporting the object.

In various implementations, the hanger 44 includes more than one hook 92. The hooks 92 may be distributed along the longitudinal axis 46 or the hooks 92 may be oriented in different directions with respect to the longitudinal axis 46, for example, two hooks 92 may be disposed at −45° and +45°, respectively, relative to the longitudinal axis 46. In various implementations, the hanger 44 includes alternative features for hanging or supporting an object in addition to or instead of the hook 92. An alternative features may include a ring, a knob, a clip, a clamp, or a pair of prongs.

The first portion 88 of the hanger 44 includes an inner surface 94 that faces the anchor wall 52 of the base 42 when the hanger 44 is in the engaged configuration. Referring to FIGS. 8 and 9, first and second flanges 98, 100 extend from the inner surface 94 of the first portion 88 of the hanger 44 toward the anchor wall 52. The first flange 98 engages the first side wall 54 and the anchor wall 52 of the base 42 when the hanger 44 is in the engaged configuration. The second flange 100 engages the second side wall 55 and the anchor wall 52 of the base 42 when the hanger 44 is in the engaged configuration.

The first portion 88 of the hanger 44 includes a first outwardly-extending projection 101. The first outwardly-extending projection 101 extends from the inner surface 94. The first outwardly-extending projection 101 contacts the inner surface 72 of the anchor wall 52 of the base 42 when the hanger 44 is in the engaged configuration. The first outwardly-extending projection 101 has a square-shaped profile. In various implementations, the outwardly-extending projection 101 includes one or more ribs and/or has a profile with another shape, such as a rectangle or a circle.

The first portion 88 of the hanger 44 further includes an outer surface 102 opposite the inner surface 94. The outer surface 102 faces the retaining wall 56 when the hanger 44 is in the engaged configuration. The hanger 44 includes third and fourth flanges 104, 106 and a second outwardly-extending projection 107 extending from the outer surface 102 of the hanger 44. The second outwardly-extending projection 107 has a square-shaped profile. In various implementations, the second outwardly-extending projection 107 includes one or more ribs and/or has a profile with another shape, such as a rectangle or a circle.

The third flange 104 engages the first side wall 54 and the first lip 78 of the retaining wall 56 of the base 42 when the hanger 44 is in the engaged configuration. The fourth flange 106 engages the second side wall 55 and the second lip 80 of the retaining wall 56 of the base 42 when the hanger 44 is in the engaged configuration. The flanges 98, 100, 104, 106 and the first outwardly-extending projection 101 engage the base 42 to counteract torque applied to the hanger 44, for example, when an object is placed on the hook 92. The flanges 98, 100, 104, 106 also reduce the contact surface area between the hanger 44 and the base 42 compared to planar contact surfaces without flanges. Thus, the flanges 98, 100, 104, 106 reduce the friction between the hanger 44 and the base 42 and enable the user to remove the hanger 44 from the base 42 using minimal force.

Returning to FIGS. 4-6, the second portion 90 of the hanger 44 includes a first region 108, a second region 110, and a third region 112. The first region 108 of the second portion 90 of the hanger 44 is disposed adjacent to the first portion 88 of the hanger 44. The second region 110 of the second portion 90 of the hanger 44 includes the hook 92. The third region 112 of the second portion 90 of the hanger 44 is disposed between the first region 108 and the second region 110.

The first region 108 of the second portion 90 of the hanger 44 includes a first inner surface 114 (FIG. 5) that is adjacent to and coplanar with the inner surface 94 of the first portion 88 of the hanger 44. A perimeter edge 116 extends around the inner surface 94 of the first portion 88 and the first inner surface 114 of the second portion 90. A peripheral wall 118 includes the first and second flanges 98, 100 of the first portion 88 and defines the perimeter 116. The first region 108 includes a first outer surface 120 (FIG. 6) that is adjacent to and coplanar with the outer surface 102 of the first portion 88 of the hanger 44.

The second region 110 of the second portion 90 of the hanger 44 includes a second inner surface or support surface 122 (FIG. 5) and a second outer surface 124 (FIG. 6). The second inner surface 122 and the second outer surface 124 both have arc-shaped profiles. The second inner surface 122 engages the hanging object to support the hanging object. The second outer surface 124 includes outwardly-extending ribs 126 projected therefrom. The ribs 126 increase the rigidity of the hook 92 to provide structural support when the object is hanging on the hook 92.

The third region 112 of the second portion 90 of the hanger 44 includes a third inner surface 128 and a third outer surface (not shown). The third inner surface 128 and the third outer surface are at least partially disposed on a hook wall 132. The hook wall 132 is parallel to the stop wall 58 of the base 42 when the hanger 44 is assembled to the base 42. Thus, the user can apply force to the hook wall 132 to insert the hanger 44 into the base 42.

Triangular side walls 134 extends between the third and fourth flanges 104, 106 of the first portion 88 of the hanger 44 and the ribs 126 of the second portion 90 of the hanger 44. The triangular side walls 134 connect the first outer surface 120 and the third outer surface (not shown) of the second portion 90 of the hanger 44. The triangular side walls 134 increase the rigidity of the hanger 44 and provide structural support when the object is hanging on the hook 92.

The hanger 44 and the base 42 are sized to yield an interference fit to maintain the hanger 44 within the channel 86 is the base 42 when the hanger 44 is in the engaged configuration. Referring to FIG. 7, the interference fit is created by inwardly-extending protrusions 138 on the interior surface 84 of the base 42. More specifically, the first side wall 54 includes the protrusion 138 and the second side wall 55 includes the protrusion 138. The protrusion 138 of the first side wall 54 extends toward the second side wall 55 and the protrusion 138 of the second side wall 55 extends toward the first side wall 54. The protrusions 138 engage the hanger 44 to create the interference fit. In various implementations, the hanger 44 may include a single protrusion 138 that yields the interference fit.

In various implementations, the interference fit is generated by other geometries. In one example, the interference fit is created based on the size of the channel 86 of the base 42 or the size of the hanger 44 along the entire length of the first and second side walls 54, 55. In another example, the hanger 44 includes outwardly-extending protrusions (not shown) that engage the first and second side walls 54, 55 of the base 42 to yield the interference fit.

The interference fit between the hanger 44 and the base 42 provides a high retention force. At the same time, the geometry of the protrusions 138 and the size of the interference results in a low insertion force when the user slides the hanger 44 between the disengaged and engaged configurations. The size of the interference is greater than or equal to 0.05 mm and less than or equal to 0.15 mm, optionally 0.1 mm.

As discussed above, the hanger assembly 12 is used to store hanging objects within the interior 15 of the vehicle 10. To use the hanger assembly 12, the user inserts the hanger 44 into an open end 142 of the base 42. The user slides the hanger 44 in the first direction 48 along the longitudinal axis 46 and into the channel 86 of the base 42. The hanger 44 engages the protrusions 138 of the base 42 as it slides along the longitudinal axis 46 to maintain the hanger 44 within the channel 86 of the base 42. The hanger 44 is disposed in the engaged configuration when the first portion 88 of the hanger 44 engages the stop wall 58 of the base 42 to prevent further motion of the hanger 44 in the first direction 48.

The user hangs an object from the hook 92 so that the object is supported by the third inner surface 128 of the second portion 90 of the hanger 44. As the object applies a downward force on the hook 92, the anchor wall 52 and the retaining wall 56 of the base 42 support the hanger 44. The user can easily remove the object from the hook 92. The user removes the hanger 44 from the base 42 by sliding the hanger 44 along the longitudinal axis 46 in the second direction 50.

In various implementations, the location of the hook 92 is adjustable within the channel 86 of the base 42 with respect to the component (e.g., along the length of the cargo cover 26). For example, the base 42 may be significantly longer than the hanger 44 so that the user can translate the hanger 44 along the longitudinal axis 46 to change the location of the hook 92. Thus, the user can optimally position the hook 92 to avoid obstructions in the rear storage area 14 when the object is placed on the hook 92. The user can also slide the hanger 44 into a first position to load the object onto the hook 92 and then slide the hanger 44 into a second position that is less readily accessible than the first position to store the object on the hook 92.

In various implementations, the hanger 44 can be removed from the base 42 without sliding the hanger 44 along the longitudinal axis 46. In one example, the first and second lips 78, 80 of the retaining wall 56 of the base 42 are hinged so, that they pivot outward with respect to the respective first and second side walls 54, 55. In another example, the retaining wall 56 is hinged at the third lip 82 and pivotable with respect to the stop wall 58.

Although the hanger assembly 12 is shown in vehicle storage areas, alternative locations and uses are contemplated. For example, multiple hanger assemblies can be cooperatively configured within a storage area to support a larger structure such as a cross-car net, a bungee cord, or a curtain. The larger structure can also be an assembly for use when the vehicle is parked, such as tools or a table. In another example, the hanger assembly includes a clip or prongs instead of the hook 92 to support a GPS device, a phone, or a tablet. In still another example, the hanger assembly 12 includes a ring for supporting a beverage within the interior 15 of the vehicle 10.

The hanger assembly 12 may be used for non-automotive vehicle applications, such as in airplanes, boats, and tractors. The hanger assembly 12 may also be useful in any other non-vehicle applications where high retention and low insertion force are desirable for a removable hook. For example, the hanger assembly 12 can be used on movie theater seats, in a classroom, in an office, or in a home, such as in a closet or in a kitchen.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean, a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for."

What is claimed is:

1. A hanger assembly for hanging an object within an interior of a vehicle, the hanger assembly comprising:
a base configured to be fixed to a component within the interior of the vehicle, the base including an anchor wall, first and second side walls extending from the anchor wall, and a retaining wall adjacent to the first and second side walls and opposite the anchor wall, the retaining wall including a first lip extending from the first side wall toward the second side wall and a second lip extending from the second side wall toward the first side wall, the anchor wall, the first and second side walls, and the retaining wall cooperating to define a channel having a longitudinal axis; and
a hanger that is slidable within the channel along the longitudinal axis, the hanger including a first portion configured to be disposed within the channel of the base and a second portion including a hook that is configured to support the object, the first portion having an inner surface that is oriented toward the anchor wall when the hanger is disposed in the channel and an outer surface that is oriented toward the retaining wall when the hanger is disposed in the channel.

2. The hanger assembly of claim 1 wherein:
the hanger is slidable within the channel between an engaged configuration and a disengaged configuration;
when the hanger is in the engaged configuration, the hanger is disposed within the channel; and
when the hanger is in the disengaged configuration, the hanger is removed from the channel such that the hanger is completely disengaged from the base.

3. The hanger assembly of claim 1 wherein:
the first portion of the hanger further includes first and second flanges extending from the inner surface;
the first flange engages the first side wall and the anchor wall when the hanger is disposed in the channel; and
the second flange engages the second side wall and the anchor wall when the hanger is disposed in the channel.

4. The hanger assembly of claim 1 wherein:
the first portion of the hanger further includes third and fourth flanges extending from the outer surface;
the third flange engages the first side wall when the hanger is disposed in the channel; and
the fourth flange engages the second side wall and when the hanger is disposed in the channel.

5. The hanger assembly of claim 1 wherein the hook has an inside surface configured to support the object, an outside surface opposite the inside surface, and a plurality of ribs projecting from the outside surface.

6. The hanger assembly of claim 1 wherein the hanger and the base are sized to yield an interference fit between the hanger and the base to maintain the hanger within the channel.

7. The hanger assembly of claim 6 wherein
at least one of the first side wall and the second side wall includes a protrusion that is configured to extend toward the hanger and engage the hanger to yield the interference fit.

8. A hanger assembly for hanging an object within an interior of a vehicle, the hanger assembly comprising:
a base configured to be fixed to a component within the interior of the vehicle, the base including an anchor wall, first and second side walls extending from the anchor wall, a retaining wall adjacent to the first and second side walls and opposite the anchor wall, and a stop wall extending from the anchor wall between the first side wall and the second side wall, the anchor wall, the first and second side walls, and the retaining wall cooperating to define a channel having a longitudinal axis; and
a hanger that is slidable within the channel along the longitudinal axis, the hanger including a first portion configured to be disposed within the channel of the base and a second portion including a hook that is configured to support the object, the first portion having an inner surface that is oriented toward the anchor wall when the hanger is disposed in the channel and an outer surface that is oriented toward the retaining wall when the hanger is disposed in the channel, wherein:

the hanger is slidable within the channel between an engaged configuration and a disengaged configuration;

when the hanger is in the engaged configuration, the hanger is disposed within the channel;

when the hanger is in the disengaged configuration, the hanger is removed from the channel such that the hanger is completely disengaged from the base; and the stop wall engages the first portion of the hanger to prevent translation of the hanger in a first direction beyond a first position when the first portion of the hanger is inserted into the channel.

9. The hanger assembly of claim 8 wherein the second portion of the hanger includes a hook wall that is parallel to the stop wall when the hanger is disposed in the base, the hook wall being disposed between the hook and the first portion of the hanger.

10. The hanger assembly of claim 8 wherein:
the first portion of the hanger further includes first and second flanges extending from the inner surface;
the first flange engages the first side wall and the anchor wall when the hanger is disposed in the channel; and
the second flange engages the second side wall and the anchor wall when the hanger is disposed in the channel.

11. The hanger assembly of claim 8 wherein:
the first portion of the hanger further includes third and fourth flanges extending from the outer surface;
the third flange engages the first side wall and the retaining wall when the hanger is disposed in the channel; and
the fourth flange engages the second side wall and the retaining wall when the hanger is disposed in the channel.

12. The hanger assembly of claim 8 wherein the hook has an outside surface and a plurality of ribs projecting from the outside surface.

13. The hanger assembly of claim 8 wherein the hanger and the base are sized to yield an interference fit between the hanger and the base to maintain the hanger within the channel when the hanger is in the engaged configuration.

14. The hanger assembly of claim 13 wherein at least one of the first side wall and the second side wall includes a protrusion that is configured to extend toward the hanger and engage the hanger to yield the interference fit.

15. A cargo cover assembly for a vehicle, the cargo cover assembly comprising:
a rigid cargo cover pivotally attached to a component in the vehicle and movable between a closed position to conceal a rear storage area in the vehicle and an open position to provide access to the rear storage area; and
a hanger assembly including a base that is fixed to the cargo cover and a hanger that is configured to be slidably disposed within a channel of the base, the base including an anchor wall that engages an underside of the cargo cover, the anchor wall defining an aperture, a fastener extending through the aperture to fix the base to the cargo cover such that the base moves with the cargo cover, the hanger assembly being concealed when the cargo cover is in the closed position, wherein:
the hanger is movable between an engaged configuration and a disengaged configuration;
when the hanger is in the engaged configuration, the hanger is disposed within the channel; and
when the hanger is in the disengaged configuration, the hanger is removed from the channel such that the hanger is completely disengaged from the base.

16. The cargo cover assembly of claim 15 wherein the hanger and the base are sized to yield an interference fit between the hanger and the base to maintain the hanger in the base when the hanger is in the engaged configuration.

17. The cargo cover assembly of claim 15 wherein:
the base further includes a retaining wall opposite the anchor wall, and first and second side walls extending between the anchor wall and the retaining wall; and
the hanger engages the first and second side walls to yield an interference fit.

* * * * *